US012802355B2

(12) United States Patent
Kim et al.

(10) Patent No.: US 12,802,355 B2
(45) Date of Patent: Nov. 17, 2026

(54) METHOD FOR CREATING 3D OBJECTS FOR AERIAL VIEW VIDEO BASED MAP, AND COMPUTER PROGRAM RECORDED ON RECORDING MEDIUM FOR EXECUTING METHOD THEREFOR

(71) Applicant: MOBILTECH, Seoul (KR)

(72) Inventors: Jae Seung Kim, Seoul (KR); Hayeon Jo, Uiwang-si (KR)

(73) Assignee: MOBILTECH, Seoul (KR)

( * ) Notice: Subject to any disclaimer, the term of this patent is extended or adjusted under 35 U.S.C. 154(b) by 119 days.

(21) Appl. No.: 18/746,494

(22) Filed: Jun. 18, 2024

(65) Prior Publication Data

US 2025/0278894 A1 Sep. 4, 2025

(30) Foreign Application Priority Data

Feb. 29, 2024 (KR) ........................ 10-2024-0029621

(51) Int. Cl.
*G06T 17/05* (2011.01)
*G01C 21/00* (2006.01)
(Continued)

(52) U.S. Cl.
CPC .......... *G06T 17/05* (2013.01); *G01C 21/3852* (2020.08); *G06T 7/11* (2017.01);
(Continued)

(58) Field of Classification Search
CPC ........... B01L 2300/02; B01L 2300/021; B01L 2300/04; B01L 2300/044; B01L 2300/049; B01L 2300/0854; B01L 2300/0858; B01L 2400/043; B01L 3/021; B01L 3/0279; B01L 3/50853; B01L 3/523; B01L 3/5453; B01L 7/5255; B01L 9/06; C12Q 1/6844; C12Q 2523/32; C12Q 2527/101; C12Q 2531/113; C12Q 2565/629; G06T 17/00;
(Continued)

(56) References Cited

U.S. PATENT DOCUMENTS 10,101,746 B2 * 10/2018 Izzat .................. G01C 21/3811
2009/0079761 A1 * 3/2009 Kokojima ............ H04N 13/111
345/619
(Continued)

FOREIGN PATENT DOCUMENTS

JP 2023-091828 A 7/2023
KR 10-2013-0086509 A 8/2013
(Continued)

*Primary Examiner* — Ming Wu
(74) *Attorney, Agent, or Firm* — Bridgeway IP Law Group, PLLC; Jihun Kim

(57) ABSTRACT

Proposed is a method for creating a 3D object for an aerial view video based map, intended to generate the 3D object on a 3D map produced using the aerial view video. The method may include designating a processing region for generating at least one 3D object model on a map generated based on an aerial view video, by a map generating device, selecting a type of an object model that is to be generated in the designated processing region, by the map generating device, and generating a pre-stored object model corresponding to the selected type within the designated processing region, by the map generating device.

8 Claims, 15 Drawing Sheets

(51) Int. Cl.

| | |
|---|---|
| ***G06T 7/11*** | (2017.01) |
| ***G06T 7/13*** | (2017.01) |
| ***G06T 7/50*** | (2017.01) |
| ***G06T 7/90*** | (2017.01) |
| ***G06V 10/764*** | (2022.01) |
| ***G06V 20/17*** | (2022.01) |

(52) U.S. Cl.

CPC .................. *G06T 7/13* (2017.01); *G06T 7/50* (2017.01); *G06T 7/90* (2017.01); *G06V 10/764* (2022.01); *G06V 20/17* (2022.01); *G06T 2207/10028* (2013.01); *G06T 2207/10032* (2013.01)

(58) Field of Classification Search

CPC ..................... G06T 17/05; G06T 19/20; G06T 2207/10028; G06T 2207/10032; G06T 7/11; G06T 7/13; G06T 7/50; G06T 7/90; G01N 2035/00326; G01N 2035/00752; G01N 2035/0091; G01N 35/0092; G01N 35/0098; G06V 10/764; G06V 20/17; G06V 20/176

See application file for complete search history.

(56) References Cited

U.S. PATENT DOCUMENTS

| | | | | |
|---|---|---|---|---|
| 2017/0084038 | A1* | 3/2017 | Dane | G06T 7/20 |
| 2020/0372626 | A1* | 11/2020 | Dal Mutto | G06N 3/084 |
| 2021/0142497 | A1* | 5/2021 | Pugh | G06T 19/006 |

FOREIGN PATENT DOCUMENTS

| | | | |
|---|---|---|---|
| KR | 10-1659779 | B1 | 9/2016 |
| KR | 10-1691620 | B1 | 1/2017 |
| KR | 10-2242834 | B1 | 4/2021 |
| KR | 10-2022-0163227 | A | 12/2022 |

* cited by examiner

METHOD FOR CREATING 3D OBJECTS FOR AERIAL VIEW VIDEO BASED MAP, AND COMPUTER PROGRAM RECORDED ON RECORDING MEDIUM FOR EXECUTING METHOD THEREFOR

CROSS REFERENCE TO RELATED APPLICATION

This application claims priority from Republic of Korea Patent Application No. 10-2024-0029621, filed on Feb. 29, 2024, which is hereby incorporated by reference in its entirety.

BACKGROUND

Field

The present disclosure relates to a map generating method. More particularly, the present disclosure relates to a method for creating a 3D object for an aerial view video based map and a computer program recorded on a recording medium to execute the method, which are intended to create the 3D object on a 3D map produced using the aerial view video.

Related Art

An unmanned aerial vehicle is a flight vehicle that is remotely piloted from the ground without a pilot directly boarding the vehicle, flies autonomously in an auto-piloted or semi-auto-piloted manner according to a pre-programmed route, or is equipped with artificial intelligence to perform missions according to environmental assessments. The term UAV encompasses an entire system including the flight vehicle, a payload, a ground control system or station (GCS), communication equipment (data link), support equipment, and operators.

The unmanned aerial vehicle is mainly classified into military and civilian purposes depending on its intended use. In the initial stage of the unmanned aerial vehicle, it is used for surveillance and reconnaissance purposes in a military field. However, the UAV is recently used in various civilian sectors. The civilian unmanned aerial vehicle is typically classified into a commercial UAV used in various industries for delivery, pest control, broadcasting/film shooting, and infrastructure management, and a personal UAV used in entertainment and sports fields as personal filming or racing unmanned aerial vehicles.

Meanwhile, an unmanned aerial vehicle simulator is a platform that reproduces the experience of flying the unmanned aerial vehicle in a virtual environment. This allows a user to practice flying without the risk of crashing or damaging the actual UAV. Generally, a beginner may learn the basics of flight using the simulator, while an experienced pilot may improve flying skills or test new controls using the simulator.

The unmanned aerial vehicle simulator is experiencing significant growth as the demand for effective training and simulation increases with the increasing adoption of unmanned aerial vehicle technology in various industrial fields, including construction, agriculture, logistics, insurance, chemicals, and mining. Further, as the use of the unmanned aerial vehicle increases in the military and defense sectors for missions such as rescue missions, intelligence, reconnaissance, surveillance, logistics, and disaster relief, the demand for the unmanned aerial vehicle is also increasing.

In order to effectively implement this unmanned aerial vehicle simulator, it is necessary to implement a map similar to the actual flight environment. Generally, the map used in the unmanned aerial vehicle simulator is produced using an aerial view video taken from the air through a flight vehicle such as the unmanned aerial vehicle, a hot air balloon, and an airplane. However, the map produced using the aerial view video is problematic in that it does not reflect 3D information of various objects existing on the ground.

PRIOR ART DOCUMENT

Patent Document (Patent Document 1) Korean Patent Publication No. 10-2022-0163227, '3D map making method using drone', (Dec. 9, 2022)

SUMMARY

The present disclosure provides a method for creating a 3D object for an aerial view video based map, which is intended to create the 3D object on a 3D map produced using the aerial view video.

The present disclosure also provides a computer program recorded on a recording medium to execute a method for creating a 3D object for an aerial view video based map, which is intended to create the 3D object on a 3D map produced using the aerial view video.

The problems to be solved by the present disclosure are not limited to the above-mentioned problems, and other problems which are not mentioned will be clearly understood by those skilled in the art from the following description.

In an aspect, the present disclosure provides a method for creating a 3D object for an aerial view video based map, which is intended to create the 3D object on a 3D map produced using the aerial view video. The method may include designating a processing region for generating at least one 3D object model on a map generated based on an aerial view video, by a map generating device, selecting a type of an object model that is to be generated in the designated processing region, by the map generating device, and generating a pre-stored object model corresponding to the selected type within the designated processing region, by the map generating device.

The designating may select a plurality of points on the map, and designate a polygon, made by connecting the plurality of points based on a selected order, as the processing region.

The designating may select at least one object on the map, identify a set of similar objects whose similarity to the object is higher than a preset value based on the selected object, and designate a region including all the identified similar objects as the processing region.

The designating may identify the set of similar objects by determining the similarity based on RGB (Red, Green, Blue) values of the selected object.

The designating may identify a plurality of objects included in the processing region based on depth information contained in point cloud data acquired by a lidar as well as the aerial view video, estimate an average height of the plurality of identified objects, and designate a height of the processing region based on the estimated average height.

The designating may identify an actual location on the map of the designated processing region, extract altitude restriction information about a building on a land corresponding to the identified actual location, and designate the height of the processing region based on the extracted altitude restriction information.

The designating may identify an actual location of the designated processing region, extract height information of buildings existing in the processing region, and designate the height of the processing region as the average value of the extracted heights of the buildings.

The selecting may identify a plurality of objects included in the processing region, classify a type of the identified objects based on a shape of the identified objects, and select a type of an object that exists most frequently in the processing region as the type of the object model.

The selecting may extract an edge existing in the processing region, extract one or more enclosures by the extracted edge, and identify a plurality of objects existing in the processing region through the extracted enclosures.

The selecting may display a pre-stored object model list corresponding to the type of the selected object, and select one of the displayed object model lists.

The selecting may select at least one point within the processing region, and set a color of the selected object model based on the RGB value of a pixel corresponding to the selected point.

The generating may identify a plurality of objects included in the processing region, generate the selected object model at the location of each of the plurality of identified objects, calculate the area of each of the plurality of identified objects, and change the area of the object model based on the calculated area.

The computer program may be coupled to a computing device including a transceiver, a memory, and a processor processing a command loaded in the memory. The computer program may be recorded on the recording medium to execute designating a processing region for generating at least one 3D object model on a map generated based on an aerial view video, by the processor, selecting a type of an object model that is to be generated in the designated processing region, by the processor, and generating at least one object model corresponding to the selected type within the designated processing region, by the processor.

Specific details of other embodiments are included in the detailed description and drawings.

According to embodiments of the present disclosure, an object model reflecting 3D information can be effectively created on a map that is created based on an aerial view video, through a simple process. Thereby, it is possible to support the simulation of a flight vehicle in an environment similar to reality.

Effects of the present disclosure are not limited to the above-mentioned effects, and other effects which are not mentioned will be clearly understood by those skilled in the art from the following claims.

DESCRIPTION OF EXEMPLARY EMBODIMENTS

Figure 1:
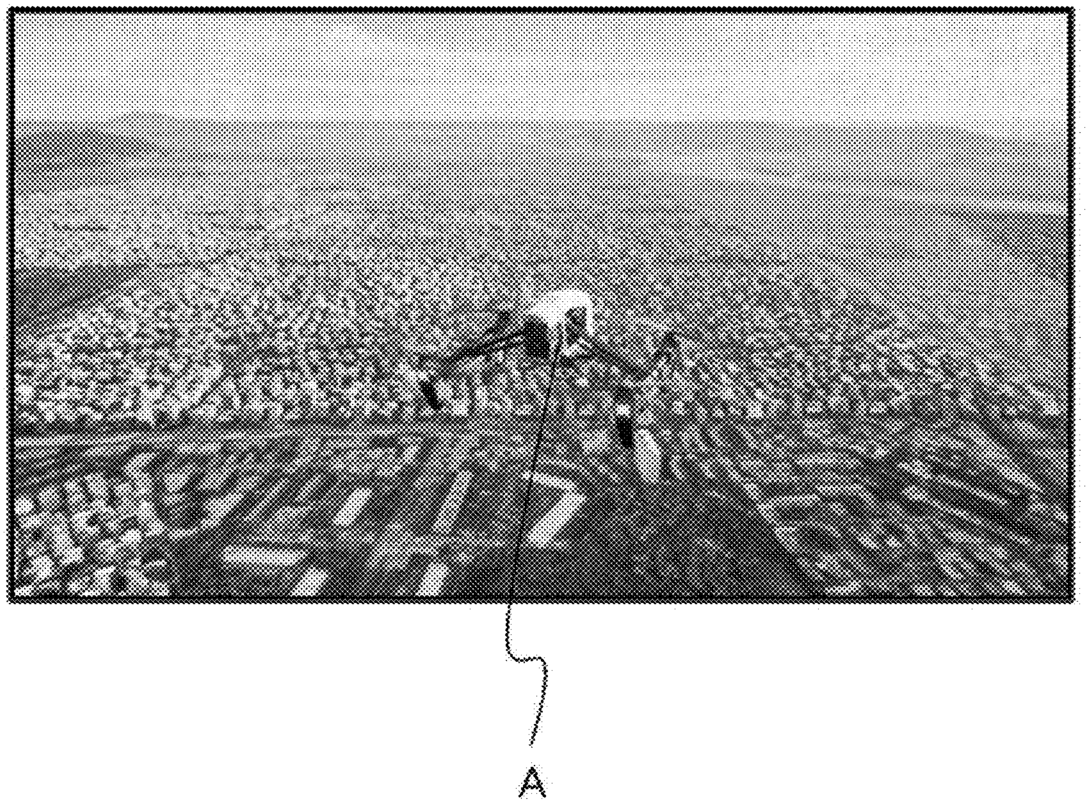
FIG. 1 is a diagram illustrating a map generating system according to an embodiment of the present disclosure.

It should be noted that technical terms used in this specification are only used to describe specific embodiments and are not intended to limit the present disclosure. Unless otherwise defined, the technical terms used herein should be interpreted as meanings generally understood by those skilled in the art in the technical field to which the present disclosure pertains, and should not be interpreted in an overly comprehensive or overly narrow sense. Further, if the technical terms used in this specification are incorrect technical terms that do not accurately express the idea of the present disclosure, they should be replaced with technical terms that can be correctly understood by those skilled in the art. Furthermore, general terms used in the present disclosure should be interpreted according to the definition in the dictionary or the context, and should not be interpreted in an excessively limited sense.

In the present disclosure, the singular forms are intended to include the plural forms as well, unless the context clearly indicates otherwise. It will be further understood that the terms “comprise”, “have”, etc. when used in this specification, specify the presence of stated steps or components but do not preclude the presence or addition of one or more other steps or components.

It will be understood that, although the terms “first”, “second”, etc. may be used herein to describe various elements, these elements should not be limited by these terms. These terms are only used to distinguish one element from another element. For instance, a first element could be termed a second element without departing from the scope of the present disclosure. Similarly, the second element could also be termed the first element.

It will be understood that when an element is referred to as being “coupled” or “connected” to another element, it can be directly coupled or connected to the other element or intervening elements may be present therebetween. In contrast, it should be understood that when an element is referred to as being “directly coupled” or “directly connected” to another element, there are no intervening elements present.

Hereinafter, preferred embodiments of the present disclosure will be described in detail with reference to the accompanying drawings. Like reference numerals refer to like parts throughout various figures and embodiments of the present disclosure, and a duplicated description thereof will be omitted. When it is determined that the detailed description of the known art related to the present disclosure may obscure the gist of the present disclosure, the detailed description will be omitted. Further, it is to be noted that the accompanying drawings are only intended to easily understand the spirit of the present disclosure and are not to be construed as limiting the spirit of the present disclosure. It is to be understood that the present disclosure is intended to cover not only the exemplary embodiments, but also various alternatives, modifications, equivalents and other embodiments that fall within the spirit and scope of the present disclosure.

Meanwhile, in order to effectively implement an unmanned aerial vehicle simulator, it is necessary to implement a map similar to an actual flight environment. Generally, the map used in the unmanned aerial vehicle simulator is produced using an aerial view video taken from the air through a flight vehicle such as the unmanned aerial vehicle, an ad balloon, and an airplane. However, the map produced using the aerial view video is problematic in that it does not reflect 3D information of various objects existing on the ground.

In order to overcome the drawbacks, the present disclosure is intended to propose various means that can reflect 3D information of objects on a 3D map produced using an aerial view video.

Figure 2:
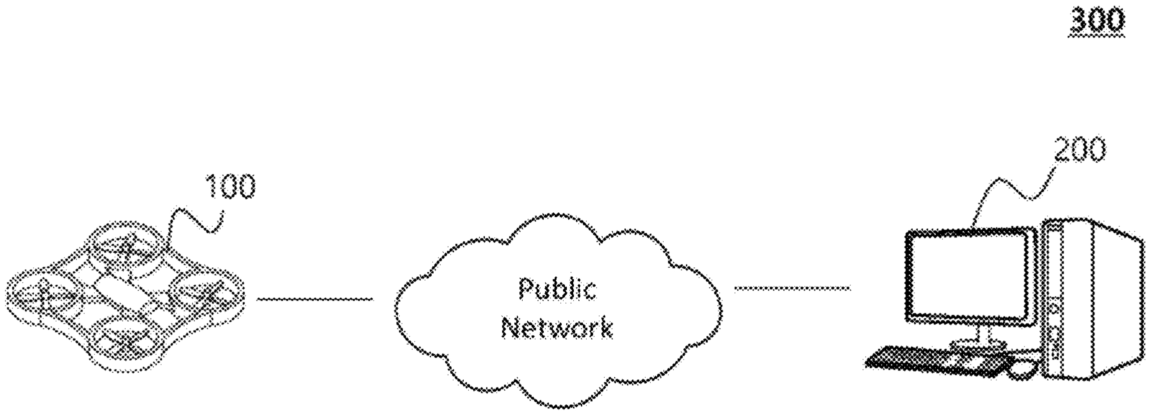
FIG. 2 is a configuration diagram of the map generating system according to an embodiment of the present disclosure.

FIG. 1 is a diagram illustrating a map generating system according to an embodiment of the present disclosure, and FIG. 2 is a configuration diagram of the map generating system according to an embodiment of the present disclosure.

Specifically, FIG. 1 is a diagram showing a state in which a flight simulation is being performed by placing a virtual unmanned aerial vehicle A on a 3D map created using an aerial view video.

A map generating system 300 according to an embodiment of the present disclosure may be used to produce the 3D map for the flight simulation of the unmanned aerial vehicle A. However, without being limited thereto, the map generating system 300 may be applied to various fields that utilize the 3D map created using the aerial view video.

Referring to FIG. 2, the map generating system 300 according to an embodiment of the present disclosure may include a data collecting device 100 and a map generating device 200.

Since components of the map generating system 300 according to an embodiment of the present disclosure merely represent functionally distinct components, two or more components may be integrated with each other in an actual physical environment, or one component may be separated in the actual physical environment.

When describing each component, the data collecting device 100 may be mounted on a flight vehicle to collect data required for map generating. Here, the flight vehicle is shown as an unmanned aerial vehicle (UAV). However, without being limited thereto, various types of flight vehicles such as a hot air balloon or an airplane may be applied.

Specifically, the data collecting device 100 may include a camera and a lidar. However, without being limited thereto, the data collecting device 100 may be equipped with sensors that may sense various pieces of information to create the map.

In particular, the data collecting device 100 may acquire an aerial view video captured by the camera, and acquire point cloud data from the lidar.

Here, the camera may be mounted on the flight vehicle to acquire an image of the ground during flight. Such a camera may include any one of a color camera, a Near InfraRed (NIR) camera, a Short Wavelength InfraRed (SWIR) camera, and a Long WaveLength InfraRed (LWIR) camera.

The lidar may be mounted on the flight vehicle to emit laser pulses toward the ground and detect light reflected back by objects on the ground, thereby generating point cloud data corresponding to a 3D image of the ground.

As the following configuration, the map generating device 200 may receive the aerial view video or the point cloud data acquired by the data collecting device 100, and generate the 3D map based on the received aerial view video or point cloud data.

According to an embodiment, the map generating device 200 may designate a processing region for generating at least one 3D object model on the map generated based on the aerial view video, select the type of the object model that is to be generated in the designated processing region, and generate the pre-stored object model corresponding to the selected type within the designated processing region.

According to another embodiment, the map generating device 200 may generate a unit road model for generating at least one 3D road model on the map generated based on the aerial view video on the map, place the generated unit road model on a road corresponding to the map, and extend the placed unit road model, thereby generating a road model.

According to a further embodiment, the map generating device 200 may generate the 3D road model on the map generated based on the aerial view video, and generate traffic information on the generated 3D road model.

Meanwhile, the map generating device 200 will be described below in detail with reference to FIGS. 3 to 12.

The map generating device 200 having these characteristics may use any device as long as it may transmit and receive data to and from the data collecting device 100 and an information providing device 300 and perform calculation based on the transmitted and received data. For example, a map generating device 200 may be any one of a stationary computing device such as a desktop, a workstation, or a server, but is not limited thereto.

As described above, the data collecting device 100 and the map generating device 200 may transmit and receive data using a network that combines one or more of a secure line, a public wired communication network, or a mobile communication network that is directly connected between the devices.

For example, the public wired communication network may include ethernet, x Digital Subscriber Line (xDSL), Hybrid Fiber Coax (HFC), and Fiber to the Home (FTTH), but is not limited thereto. In addition, the mobile communication network may include Code Division Multiple Access (CDMA), Wideband CDMA (WCDMA), High Speed Packet Access (HSPA), Long Term Evolution (LTE), and 5th generation mobile telecommunication, but is not limited thereto.

Hereinafter, the logical configuration of the map generating device according to an embodiment of the present disclosure will be described.

Figure 3:
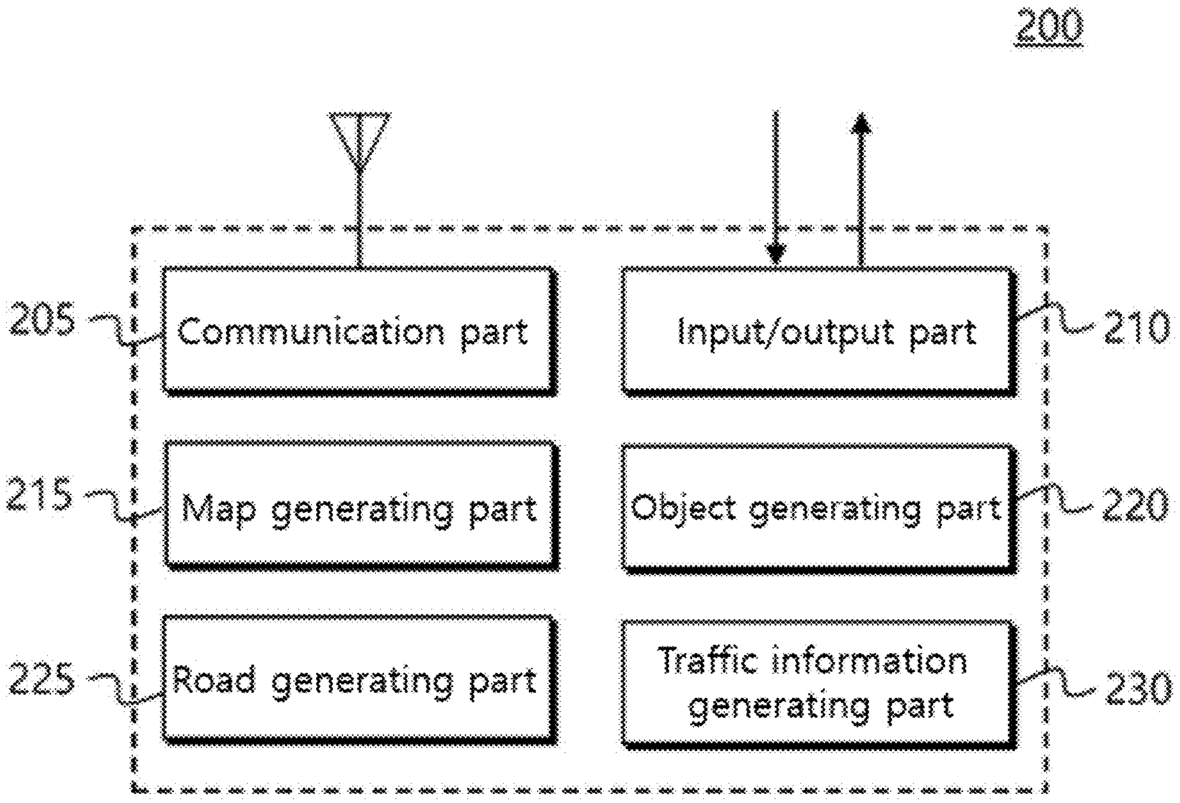
FIG. 3 is a logical configuration diagram of a map generating device according to an embodiment of the present disclosure.

FIG. 3 is a logical configuration diagram of the map generating device according to an embodiment of the present disclosure, and FIGS. 4 to 11 are diagrams illustrating the function of the map generating device according to an embodiment of the present disclosure.

Referring to FIG. 3, the map generating device 200 according to an embodiment of the present disclosure may include a communication part 205, an input/output part 210, a map generating part 215, an object generating part 220, a road generating part 225, and a traffic information generating part 230.

Since the components of the map generating device 200 merely represent functionally distinct components, two or more components may be integrated with each other in an actual physical environment, or one component may be separated in the actual physical environment.

When describing each component, the communication part 205 may transmit and receive data to and from the data collecting device 100. Specifically, the communication part 205 may receive the aerial view video captured by the camera and the point cloud data acquired by the lidar from the data collecting device 100.

As the following configuration, the input/output part 210 may receive a signal from a user through a user interface (UI), or output the calculation result to the outside. Specifically, the input/output part 210 may receive setting information for generating the map. Further, the input/output part 210 may receive various selection signals from the user during the map generating process. The input/output part 210 may output various results during the map generating process.

As the following configuration, the map generating part 215 may generate the 3D map using the aerial view video received from the data collecting device 100.

Specifically, the map generating part 215 may receive the aerial view video and measurement data on a photographing reference point from the data collecting device 100, and generate a deviation-corrected orthoimage based on the received data. The map generating part 215 may generate the 3D map by placing the generated orthoimage in a 3D space.

As the following configuration, the object generating part 220 may generate the 3D object on the 3D map produced using the aerial view video. For example, the 3D object may be a building or a tree.

In order to generate the 3D object, the object generating part 220 may designate the processing region for generating at least one 3D object model on the map generated based on the aerial view video.

In order to designate the processing region, the object generating part 220 may designate an area for generating the object on the map.

Figure 4:
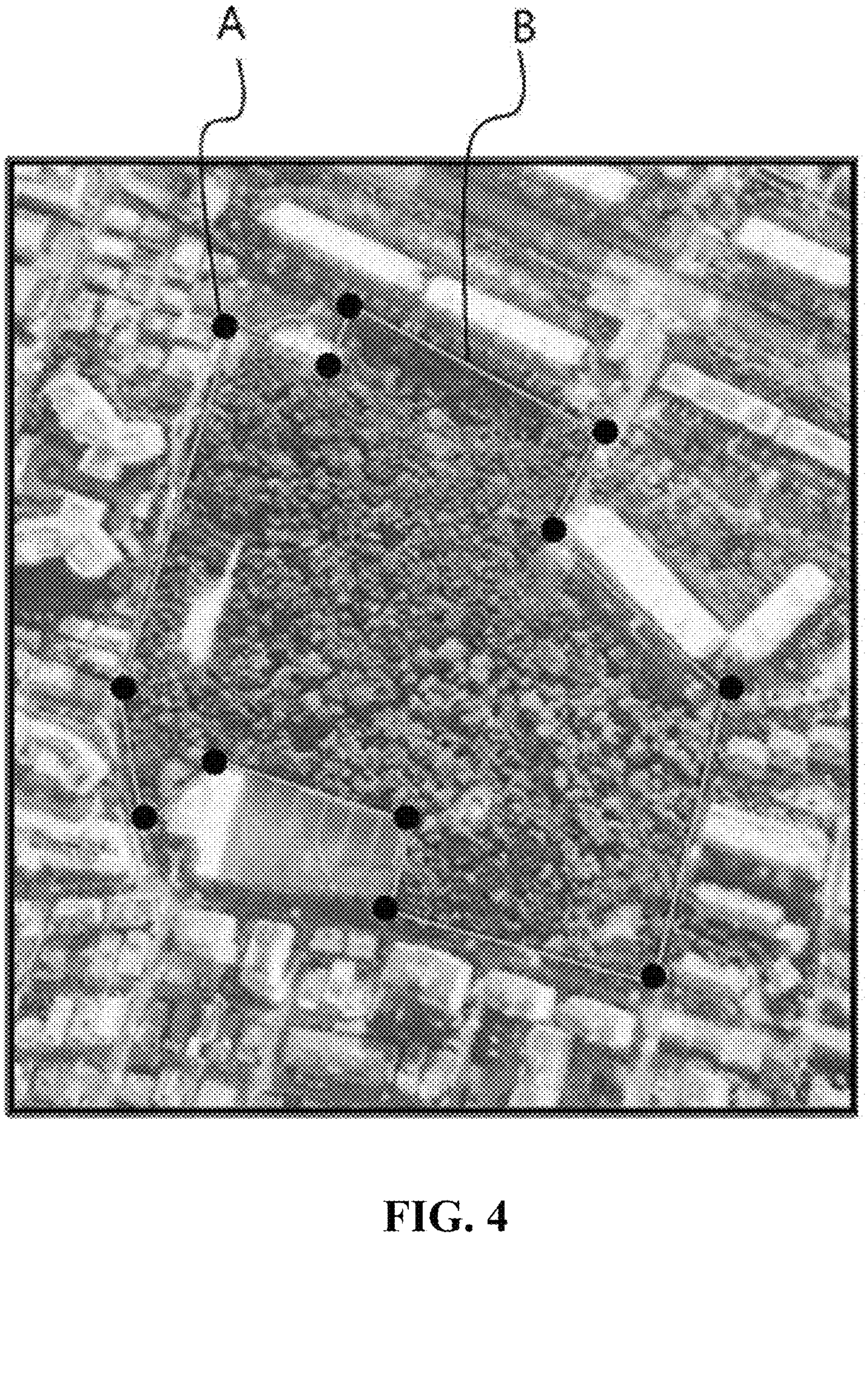
FIGS. 4 to 11 are diagrams illustrating the function of the map generating device according to an embodiment of the present disclosure.

According to an embodiment, the object generating part 220 may select a plurality of points on the map, and designate a polygon, made by connecting the plurality of points based on the selected order, as the processing region. For example, as shown in FIG. 4, the object generating part 220 may sequentially select the plurality of points A along the border of the region for generating the object on the map from the user, and generate the processing region B by connecting the plurality of selected points A.

According to another embodiment, the object generating part 220 may select at least one object on the map, identify a set of similar objects whose similarity to the object is higher than a preset value based on the selected object, and designate a region including all the identified similar objects as the processing region. At this time, the object generating part 220 may identify the set of similar objects by determining the similarity based on RGB (Red, Green, Blue) values of the selected object. For example, when a specific building is selected by the user, the object generating part 220 may identify a set of similar objects by tracking similar objects adjacent to each other by a preset distance using the RGB values of the selected building.

At this time, the object generating part 220 may identify similar objects based on the RGB value of a pixel at a point where the object is selected. However, without being limited thereto, the object generating part 220 may generate an RGB histogram for the pixel of the selected object, and compare the generated RGB histograms to calculate similarity. Here, the RGB histogram is a graph showing the brightness distribution of each primary color (RGB) in the image. For example, in the RGB histogram, a horizontal axis indicates the brightness level of the color, while a vertical axis indicates the number of pixels assigned to the brightness level of the color. The more pixels are biased to the left, the darker and less vivid the color may be expressed. The more pixels are biased to the right, the brighter and darker the color may be expressed. In this way, the object generating part 220 may calculate similarity by comparing the color chroma, grayscale status, white balance tendency, etc. of an object included in a sample image and an object included in an existing image through the RGB histogram. However, without being limited thereto, the object generating part 220 may calculate similarity by comparing moments for the edges of extracted objects.

Further, the object generating part 220 may set the height for the previously designated region.

Figure 5:
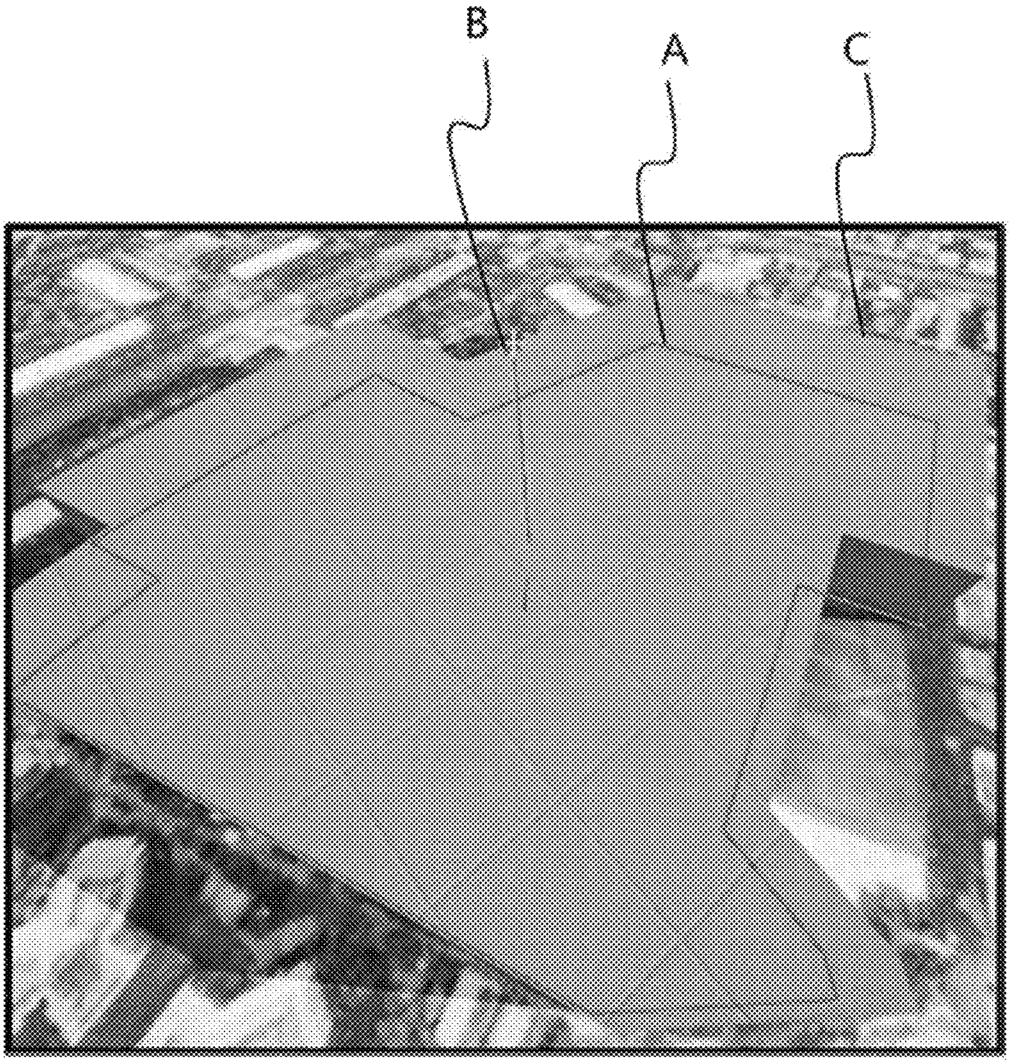

According to an embodiment, the object generating part 220 may receive the height information about the processing region from the user. For example, as shown in FIG. 5, the object generating part 220 may primarily select a region A corresponding to the area of the processing region, and set the height B of the processing region through a drag operation from the selected region, thereby creating a 3D processing region C.

According to another embodiment, the object generating part 220 may identify a plurality of objects included in the processing region based on the depth information contained in the point cloud data acquired by the lidar as well as the aerial view video, estimate the average height of the plurality of identified objects, and designate the height of the processing region based on the estimated average height. At this time, the object generating part 220 may estimate a set of points whose depth difference is less than a preset value as the object.

According to another embodiment, the object generating part 220 may identify an actual location on the map of the designated processing region, extract altitude restriction information about a building on a land corresponding to the identified actual location, and designate the height of the processing region based on the extracted altitude restriction information. For example, the object generating part 220 may access a database that stores altitude restriction information corresponding to the location, and extract the altitude restriction information of the processing region by searching the actual location corresponding to the processing region.

According to a further embodiment, the object generating part 220 may identify the actual location of the designated processing region, extract the height information of buildings existing in the processing region, and designate the height of the processing region as the average value of the heights of the extracted buildings. For example, the object generating part 220 may access a database that stores the building height information corresponding to the location, and extract the height information of the processing region by searching the building corresponding to the processing region.

Next, the object generating part 220 may select the type of the object model that is to be created in the designated processing region. That is, the object generating part 220 may select the type of an object that is to be created, such as a building or a tree.

According to an embodiment, the object generating part 220 may receive the type of the object to be created from the user. For example, the object generating part 220 may output a pre-stored object list, and select at least one of the output object lists from the user.

According to another embodiment, the object generating part 220 may identify a plurality of objects included in the processing region, classify the type of the identified objects based on the shape of the identified objects, and select the type of an object that exists most frequently in the processing region as the type of the object model. At this time, the object generating part 220 may extract an edge existing in the processing region, extract one or more enclosures by the extracted edge, and identify a plurality of objects existing in the processing region through the extracted enclosures. In this regard, the object generating part 220 may identify the object within the image by inputting the image of the processing region into the Artificial Intelligence (AI) that has undergone prior machine learning, and estimate the type of each object by assigning a class label to each object.

Subsequently, the object generating part 220 may display the pre-stored object model list corresponding to the type of the selected object, and select one of the displayed object model lists. At this time, the object generating part 220 may select at least one point within the processing region, and set the color of the selected object model based on the RGB value of the pixel corresponding to the selected point.

Figure 6:
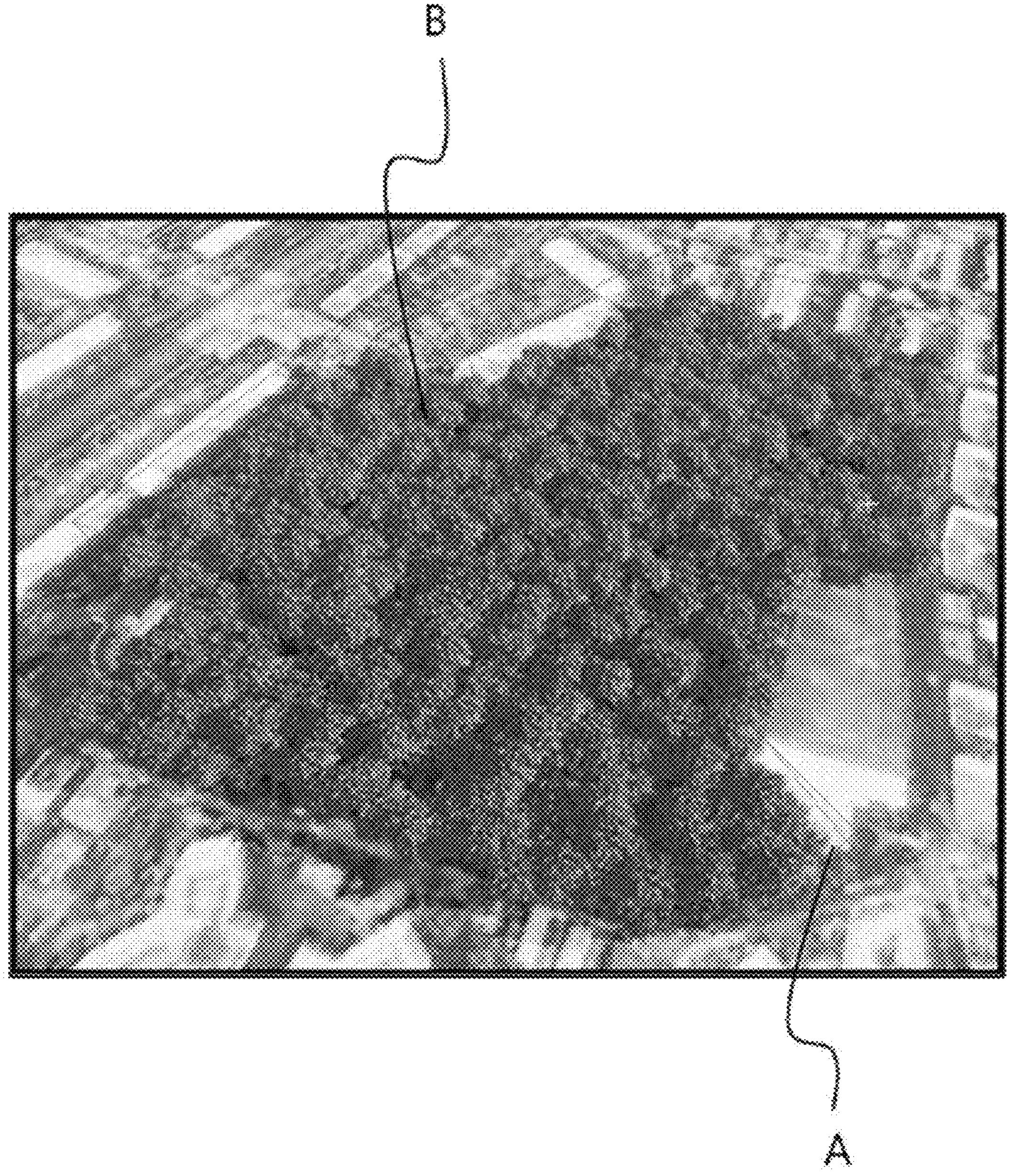
Figure 7:
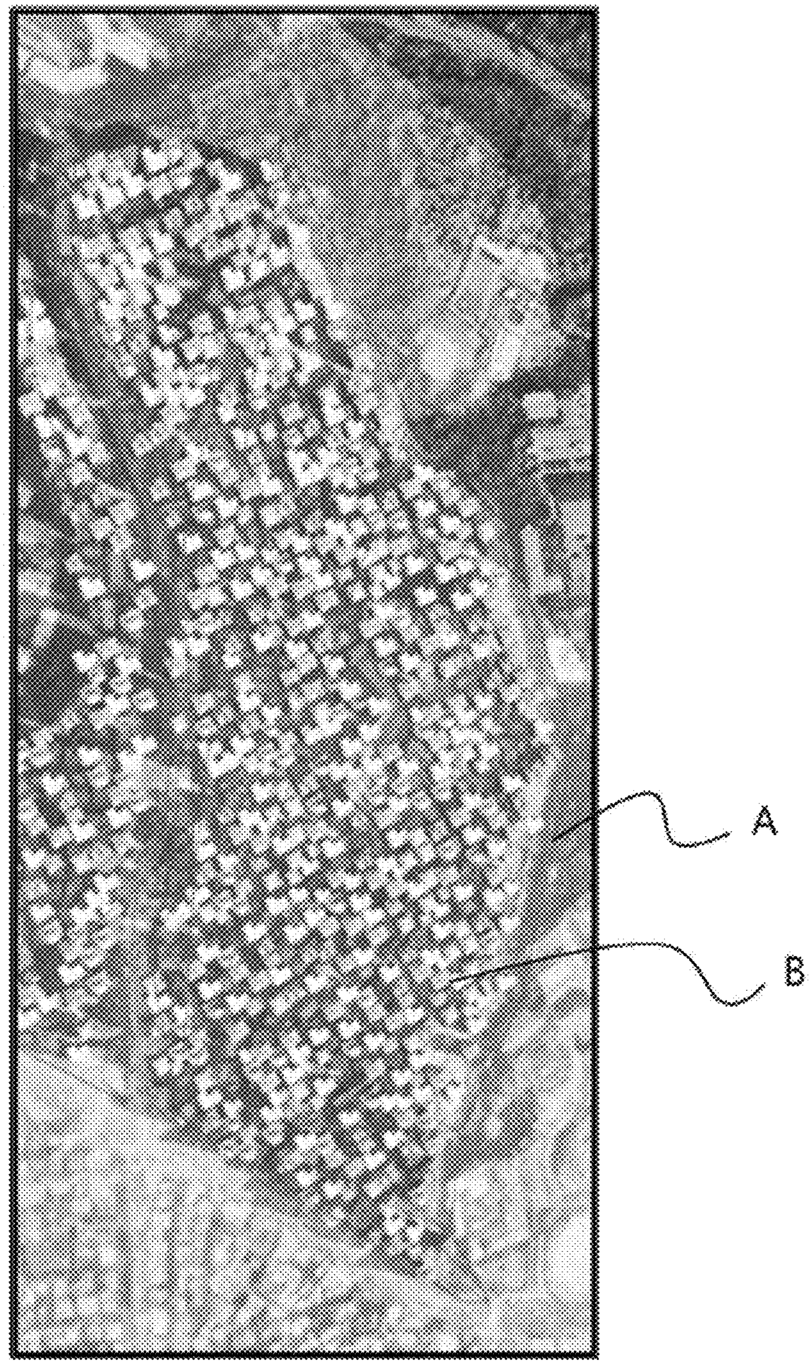

Further, the object generating part 220 may generate the pre-stored object model corresponding to the selected type within the designated processing region. That is, the object generating part 220 may place object models with a preset size within the processing region at a preset interval. For example, as shown in FIG. 6, the object generating part 220 may place a preset tree model B within the processing region A. As shown in FIG. 7, the object generating part 220 may place a preset building model B within the processing region A.

At this time, the object generating part 220 may identify a plurality of objects included in the processing region, and generate the selected object model at the location of each of the plurality of identified objects. Here, the object generating part 220 may calculate the area of each of the plurality of identified objects, change the area of the object model to be placed in the location of each object to correspond to the area of a corresponding object, and then place the object model. Further, the object generating part 220 may set the height of the object model as the height of the processing region.

As the following configuration, the road generating part 225 may generate a road on the 3D map that is made using the aerial view video.

In order to generate the road, the road generating part 220 may generate a unit road model to generate at least one 3D road model on the map that is created based on the aerial view video. Here, the unit road model may be a road model of a preset size including all the minimum components of the road. For example, the minimum components may be roadways, lanes, shoulders, medians, sidewalks, side gutters, etc.

Figure 8:
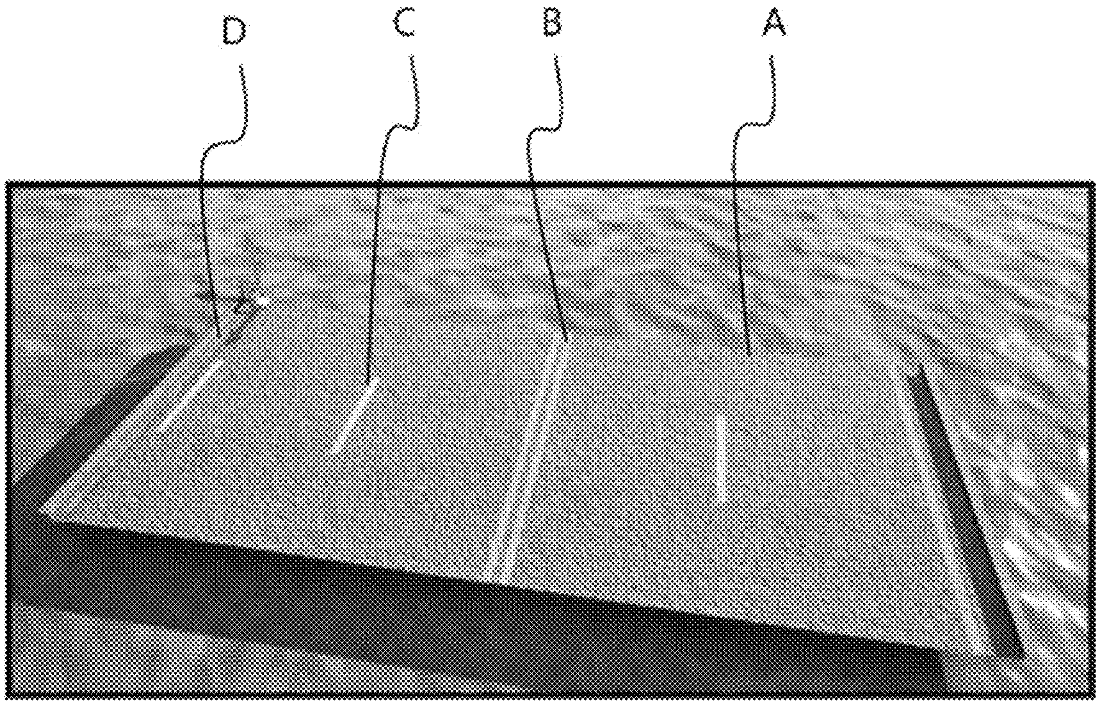

According to an embodiment, the road generating part 225 may select at least one among a plurality of pre-stored component models for the minimum components constituting the road, and combine at least one selected component model, thereby generating the unit road model. That is, when the component model is selected from the user, the road generating part 225 may display the selected component model on the map, cause the user to place the displayed component model in a specific location, and combine the placed component models, thereby providing a User interface (UI) that may generate the unit road model. For example, as shown in FIG. 8, the road generating part 225 may select a roadway model A, which is the base of the road, from the user, place the model on the map, sequentially select a center line B, a lane C, a side gutter D, etc. and place them on the roadway model A, thereby generating the unit road model.

According to another embodiment, the road generating part 225 may select at least one point on the map, identify the road based on the selected point, and estimate the shape of the road based on the RGB (Red, Green, Blue) value of the identified road. The road generating part 225 may generate, on the map, a pre-stored unit road model whose similarity to the shape of the estimated road is higher than a preset value. For example, the road generating part 225 may sequentially select a plurality of points along the border of the region corresponding to the road on the map from the user, and identify the road by connecting the plurality of selected points. In this regard, the road generating part 225 may estimate a pre-stored unit road model whose similarity to the road identified through artificial intelligence that has undergone prior machine learning is higher than a preset value, and generate the estimated unit road model on the map.

Next, the road generating part 225 may place the generated unit road model on the map. At this time, the road generating part 225 may select at least one point on the map, identify the road based on the selected point, and estimate the shape of the road based on the RGB value of the identified road. Here, the road generating part 225 may identify the direction of the road based on the shape of the estimated road, and place the unit road model based on the identified road direction. Meanwhile, the road generating part 225 is described as generating the unit road model in a specific space on the map and then placing the generated unit road model on a corresponding road. However, without being limited thereto, the road generating part may directly generate the unit road model on the corresponding road.

Further, the road generating part 225 may extend the placed unit road model, thereby generating the road model.

Figure 9:
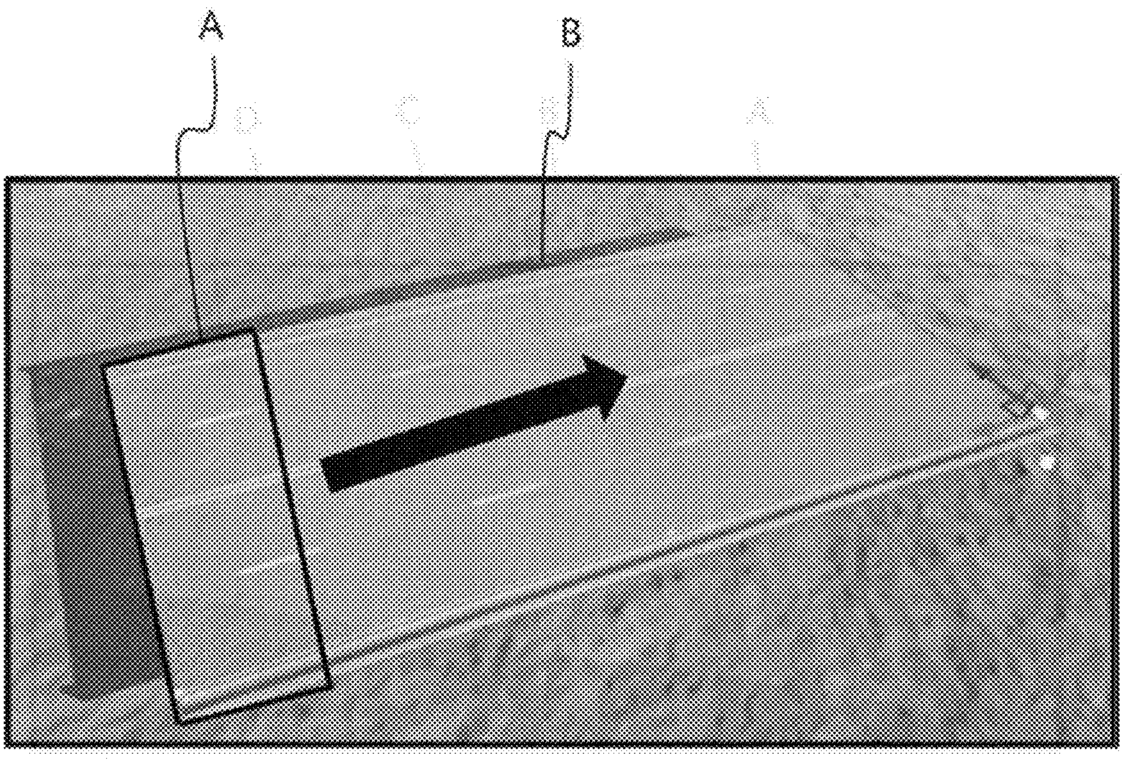

Specifically, the road generating part 225 may select an extension range based on the unit road model placed on the map, and extend the unit road model within the selected extension range. For example, as shown in FIG. 9, when the user selects the unit road model A and then drags it in a specific direction, the road generating part 225 may generate the road model B by extending the unit road model in the dragged direction.

According to an embodiment, the road generating part 225 may extend the unit road model within the selected extension range, and apply a curvature to the road model created based on the shape of the road existing within the extension range. That is, the road generating part 225 may identify the road on the map based on the shape of the road, and apply the curvature to the generated road model according to the shape of the road on the map overlapping the generated road model, when the road generating part generates the road model by extending the unit road model within the selected extension range.

According to another embodiment, the road generating part 225 may select at least one point within the identified road, and extend the unit road model to at least one point along the identified road based on the unit road model. That is, when the unit road model is placed on the corresponding road on the map and a specific point of the road is selected, the road generating part 225 may extend the unit road model by applying the curvature along the shape of the road to a point selected based on the unit road model.

Meanwhile, when encountering a pre-generated road model in the process of extending the unit road model, heights may not match and steps may occur even in the same road due to a difference in ground level or an overpass. Thus, when encountering the pre-generated road model in the process of extending the unit road model, the road generating part 225 may identify a type between a first road model generated by extending the unit road model and a pre-generated second road model, and cause the first road model and the second road model to intersect each other according to the identified type.

Figure 10:
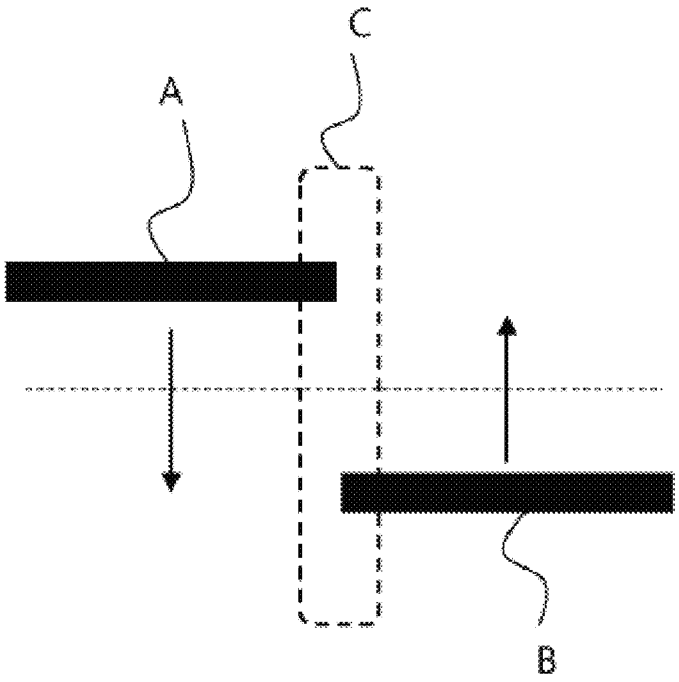

According to an embodiment, the road generating part 225 may estimate the height value of a point where roads on the map corresponding to the first road model and the second road model meet, based on the depth information contained in the point cloud data acquired by the lidar along with the aerial view video. The road generating part 225 may perceive the road as a continuous road if a difference between the estimated height values of each road is less than a preset value. Here, as shown in FIG. 10, the road generating part 225 may connect the first road model A and the second road model B by applying the average value of the estimated height values of each road.

According to another embodiment, the road generating part 225 may estimate the height value of a point where roads on the map corresponding to the first road model and the second road model meet, based on the depth information contained in the point cloud data acquired by the lidar along with the aerial view video. If a difference between the estimated height values of each road exceeds a preset value, the road generating part 225 may perceive the road as a separate road and apply different heights to the first road model and the second road model to make them intersect. For example, the road generating part 225 may apply the estimated height values of each road to the first road model and the second road model, respectively, to make them intersect each other.

According to another embodiment, the road generating part 225 may estimate the shape of the road on which the first road model and the second road model intersect based on the RGB value of the map, and identify the road type based on the estimated shape of the road. The road generating part 225 may cause the first road model and the second road model to intersect each other according to the identified road type. For example, the road generating part 225 may identify the road type such as an intersection or an overpass based on the shape of the road, and may connect the first road model and the second road model or intersect the models by applying different height values, according to the identified road type.

According to a further embodiment, the road generating part 225 may identify a shadow on the road where the first road model and the second road model intersect based on the RGB value of the map, and estimate the relative locations of the first road model and the second road model based on the identified shadow. The road generating part 225 may cause the first road model and the second road model to intersect each other according to the estimated relative locations. For example, the road generating part 225 may identify the shadow on the road based on the color information corresponding to the shadow, estimate the road on which the shadow is created as a road located under another intersecting road, and may cause the first road model and the second road model to intersect each other according to the estimated relative locations. At this time, the road generating part 225 may cause the first road model and the second road model to intersect each other by applying a preset height difference according to the width of the identified shadow.

As the following configuration, the traffic information generating part 230 may generate the traffic information on the generated road model. Specifically, the traffic information generating part 230 may generate at least one vehicle model moving at a preset speed along each lane of the road model.

According to an embodiment, the traffic information generating part 230 may receive real-time vehicle congestion information on the road corresponding to the road model, and may determine at least one of the number and speed of vehicle models for each region of the road model according to the vehicle congestion information received in real time. For example, the traffic information generating part 230 may receive the real-time vehicle congestion information on the road using a traffic information application programming interface (API) provided by a specific organization, and generate a vehicle model that moves on the road model by reflecting the actual vehicle congestion information.

According to another embodiment, the traffic information generating part 230 may receive weather information of a region corresponding to the location of the road model in real time, and determine at least one of the number and speed of vehicle models for each region of the 3D road model according to the weather information received in real time. For example, the traffic information generating part 230 may use an application program interface provided by the Meteorological Administration to generate a vehicle model that moves on the road model by reflecting weather information of the location where the corresponding road exists. At this time, the traffic information generating part 230 may pre-store the number and speed of vehicle models for each weather. For example, the traffic information generating part 230 may determine that vehicle congestion is high when it is snowing or raining, and may determine that vehicle congestion is low when it is sunny.

Figure 11:
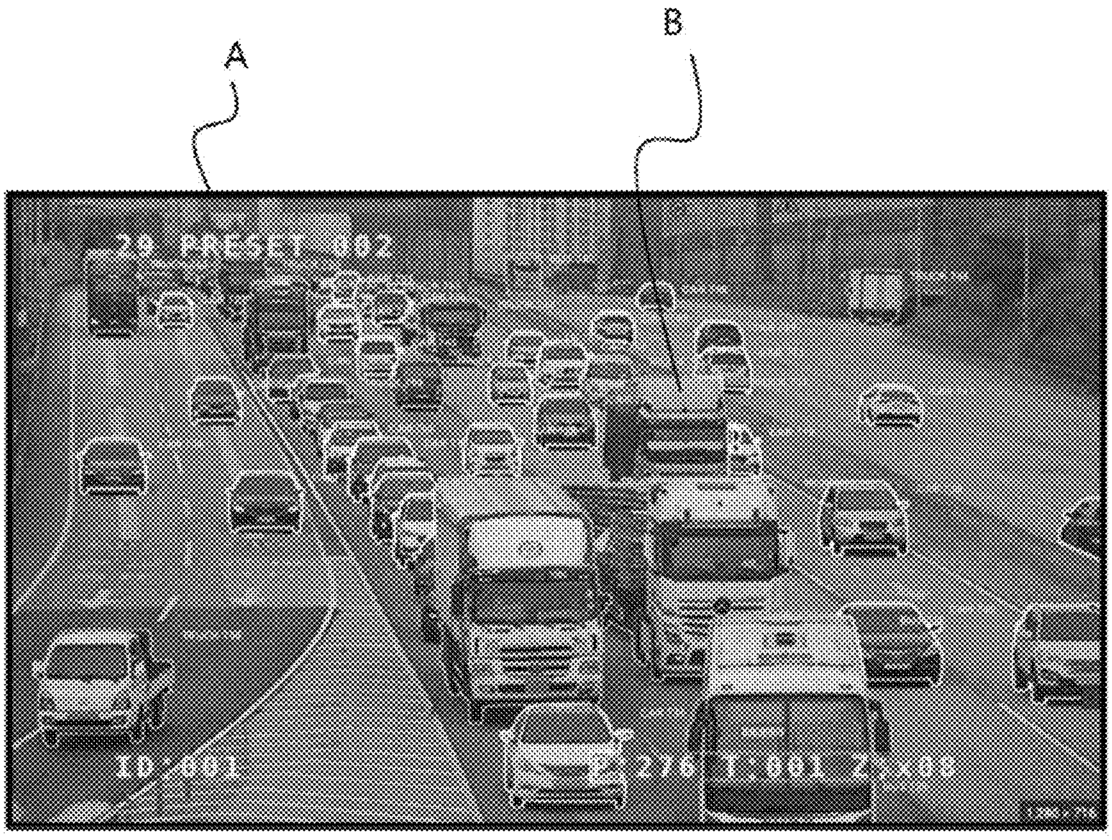

According to another embodiment, the traffic information generating part 230 may receive the video of the road corresponding to the location of the road model, analyze a traffic volume based on the received video, and create a vehicle model on the road model in response to the analyzed traffic volume. At this time, the traffic information generating part 230 may receive the video of the road from a closed circuit television (CCTV) installed in each road. Specifically, as shown in FIG. 11, the traffic information generating part 230 may detect the object B corresponding to the vehicle in the received video A, detect a lane around the detected object B, and measure a traffic volume for each lane by counting the detected objects B based on the detected lane. At this time, the traffic information generating part 230 may detect the object B corresponding to the vehicle in the video through the artificial intelligence that has undergone prior machine learning.

The traffic information generating part 230 may generate a vehicle model by varying at least one of the number and speed of vehicle models for each lane of the road model based on the measured traffic volume for each lane. Here, the traffic information generating part 230 may estimate the speed of objects detected in the received video, and determine the speed of the generated vehicle model for each lane by applying the average speed value of the estimated objects. Moreover, the traffic information generating part 230 may estimate the type of the detected vehicle based on the size of the detected object, and create the pre-stored vehicle model depending on the estimated vehicle type in the road model in response to the traffic volume.

According to another embodiment, the traffic information generating part 230 may receive speed limit information on the road corresponding to the road model, and determine the speed of the vehicle model for each region of the road model according to the received speed limit information on the road. For example, the traffic information generating part 230 may receive the speed limit information using the traffic information application programming interface provided by the specific organization.

According to another embodiment, the traffic information generating part 230 may receive traffic facility information on the road corresponding to the road model, and generate a traffic facility model at a corresponding location of the road model based on the received traffic facility information. At this time, the traffic information generating part 230 may receive in real time a traffic signal corresponding to the generated traffic facility model and control the movement of the generated vehicle model in real time according to the traffic signal received in real time. For example, the traffic information generating part 230 may receive traffic signal information using the traffic information application programming interface provided by the specific organization.

Hereinafter, hardware for implementing the logical components of the above-mentioned map generating device will be described in detail.

Figure 12:
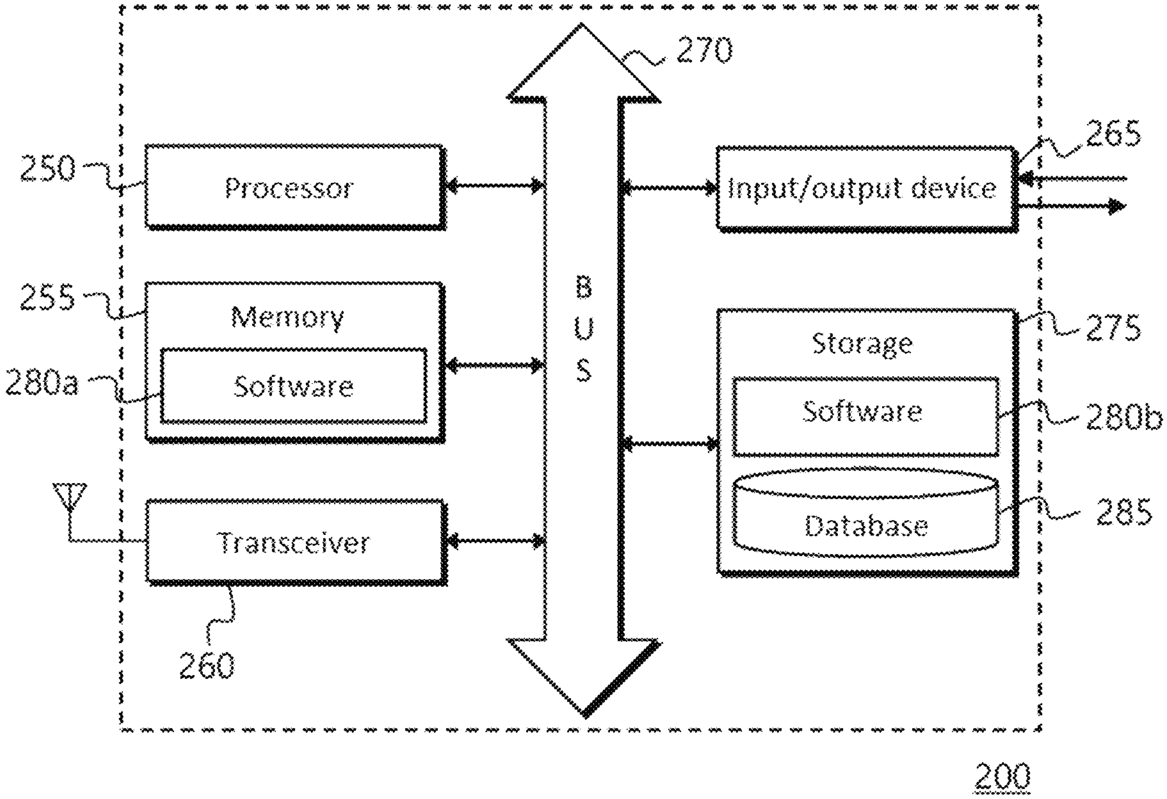
FIG. 12 is a hardware configuration diagram of the map generating device according to an embodiment of the present disclosure.

FIG. 12 is a hardware configuration diagram of the map generating device according to an embodiment of the present disclosure.

As shown in FIG. 12, the map generating device 200 may include a processor 250, a memory 255, a transceiver 260, an input/output device 265, a data bus 270, and a storage 275.

Specifically, the processor 250 may implement the operation and function of the map generating device 200 based on a command according to software 280*a* in which the map generating method is implemented and which is loaded in the memory 255.

Software 280*b* in which the map generating method is implemented and which is stored in the storage 275 may be loaded in the memory 255.

The input/output device 265 may receive a signal required for the operation of the map generating device 200 or output calculation results to the outside according to an instruction from the processor 250.

The data bus 270 may be connected to the processor 250, the memory 255, the transceiver 260, the input/output device 265, and the storage 275, and serve as a moving path for transferring a signal between components.

The storage 275 may store an application programming interface (API), a library file, a resource file, etc. required to execute the software 280*a* in which the map generating method according to embodiments of the present disclosure is implemented. The storage 275 may store software 280*b* in which the map generating method according to embodiments of the present disclosure is implemented.

According to an embodiment of the present disclosure, the software 280*a* and 280*b* loaded in the memory 255 or stored in the storage 275 to implement the method for generating the 3D object for the aerial view video based map may be a computer program recorded on a recording medium so as to execute a step in which the processor 250 designates the processing region for generating at least one 3D object model on the map generated based on the aerial view video, a step in which the processor 250 selects a type of the object model to be generated in the designated processing region, and a step in which the processor 250 generates at least one object model corresponding to the selected type in the designated processing region.

According to another embodiment of the present disclosure, the software 280*a* and 280*b* loaded in the memory 255 or stored in the storage 275 to implement the method for generating the road for the aerial view video based map may be a computer program recorded on the recording medium so as to execute a step in which the processor 250 generates on the map the unit road model for generating at least one 3D road model on the map created based on the aerial view video, a step in which the processor 250 places the generated unit road model in a corresponding road on the map, and a step in which the processor 250 extends the placed unit road model to generate the road model.

According to a further embodiment of the present disclosure, the software 280*a* and 280*b* loaded in the memory 255 or stored in the storage 275 to implement the traffic information generating method for the aerial view video based map may be a computer program recorded on the recording medium so as to execute a step in which the processor 250 generates the road model on the map generated based on the aerial view video, and a step in which the processor 250 generates traffic information in the generated road model.

To be more specific, the processor 250 may include one or more of a Central Processing Unit (CPU), an Application-Specific Integrated Circuit (ASIC), a chipset, and a logic circuit, without being limited thereto.

The memory 255 may include one or more of a Read-Only Memory (ROM), a Random Access Memory (RAM), a flash memory, and a memory card, without being limited thereto.

The input/output device 260 may include one or more of an input device such as a button, a switch, a keyboard, a mouse, or a joystick, and an output device such as a Liquid Crystal Display (LCD), a Light Emitting Diode (LED), an Organic LED (OLED), an Active Matrix OLED (AMOLED), a printer, or a plotter, without being limited thereto.

When an embodiment included herein is implemented as software, the above-described method may be implemented as modules (process, function, etc.) that perform the above-described function. Each module may be loaded in the memory 255 and be executed by the processor 250. The memory 255 may be internal or external to the processor 250, and may be connected to the processor 250 via a variety of well-known means.

Each component shown in FIG. 12 may be implemented by various means, e.g., hardware, firmware, software, or a combination thereof. In the case of implementation by hardware, an embodiment of the present disclosure may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

Further, in the case of implementation by firmware or software, an embodiment of the present disclosure may be implemented in the form of a module, procedure, function, etc. that performs the functions or operations described above, and then be recorded on the recording medium readable through various computer means. Here, the recording medium may include program instructions, data files, data structures, etc., alone or in combination.

The program instructions recorded on the recording medium may be instructions that are especially designed and constructed for the present disclosure, or may be known and available to those skilled in the art of computer software. For instance, the recording medium includes magnetic media such as hard disks, floppy disks and magnetic tapes, optical media such as CD-ROM (Compact Disk Read Only Memory) and DVD (Digital Video Disk), magneto-optical media such as floptical disks, and hardware devices specially configured to store and execute program instructions such as ROM, RAM, flash memory, etc.

Examples of program instructions may include machine language code such as that created by a compiler as well as high-level language code that may be executed by a computer using an interpreter, etc. Such a hardware device may be configured to operate as one or more software so as to perform the operation of the present disclosure, and vice versa.

Figure 13:
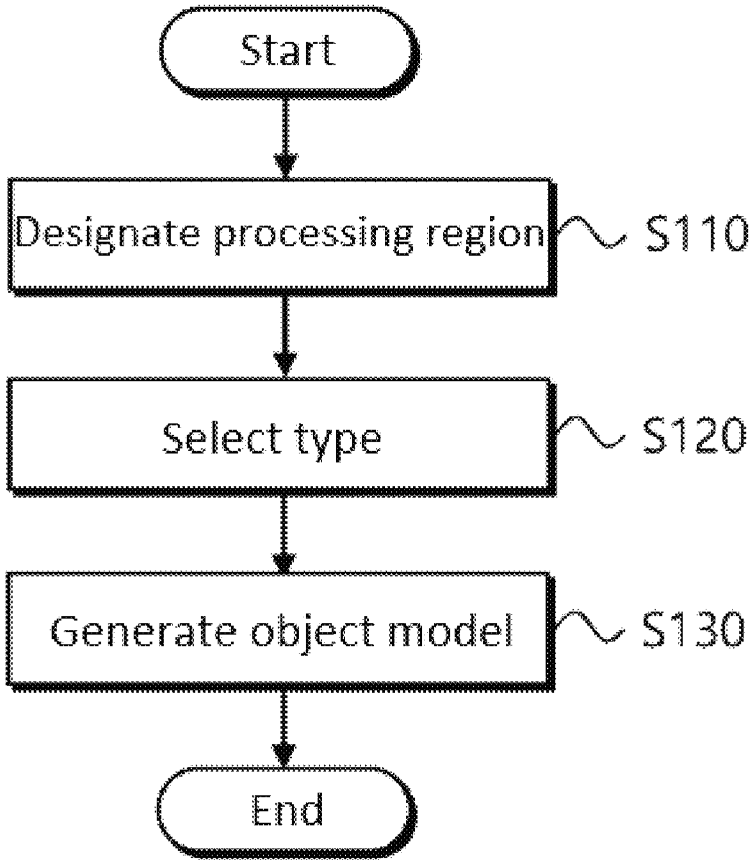
FIG. 13 is a flowchart illustrating a method for creating a 3D object according to an embodiment of the present disclosure.

FIG. 13 is a flowchart illustrating a method for creating a 3D object according to an embodiment of the present disclosure.

Referring to FIG. 13, in step S110, the map generating device may designate the processing region for generating at least one 3D object model on the map generated based on the aerial view video.

In order to designate the processing region, the map generating device may designate the area for generating the object on the map.

According to an embodiment, the map generating device may select a plurality of points on the map, and designate a polygon, created by connecting the plurality of points based on the selected order, as the processing region.

According to another embodiment, the map generating device may select at least one object on the map, identify a set of similar objects whose similarity to the object is higher than a preset value based on the selected object, and designate a region including all the identified similar objects as the processing region.

Further, the map generating device may set a height for the previously designated region.

According to an embodiment, the map generating device may receive a height for the processing region from the user.

According to another embodiment, the map generating device may identify a plurality of objects included in the processing region based on the depth information contained in the point cloud data acquired by the lidar as well as the aerial view video, estimate the average height of the plurality of identified objects, and designate the height of the processing region based on the estimated average height.

According to another embodiment, the map generating device may identify an actual location on the map of the designated processing region, extract altitude restriction information about a building on a land corresponding to the identified actual location, and designate the height of the processing region based on the extracted altitude restriction information.

According to a further embodiment, the map generating device may identify the actual location of the designated processing region, extract the height information of buildings existing in the processing region, and designate the height of the processing region as the average value of the heights of the extracted buildings.

Next, in step S120, the map generating device may select the type of the object model that is to be created in the designated processing region. That is, the map generating device may select the type of an object that is to be created, such as a building or a tree.

According to an embodiment, the map generating device may receive the type of the object to be created from the user.

According to another embodiment, the map generating device may identify a plurality of objects included in the processing region, classify the type of the identified objects based on the shape of the identified objects, and select the type of an object that exists most frequently in the processing region as the type of the object model. At this time, the map generating device may extract an edge existing in the processing region, extract one or more enclosures by the extracted edge, and identify a plurality of objects existing in the processing region through the extracted enclosures.

The map generating device may display the pre-stored object model list corresponding to the type of the selected object, and select one of the displayed object model lists. At this time, the map generating device may select at least one point within the processing region, and set the color of the selected object model based on the RGB value of the pixel corresponding to the selected point.

Further, in step S130, the map generating device may generate the pre-stored object model corresponding to the selected type within the designated processing region. That is, the map generating device may place object models with a preset size within the processing region at a preset interval.

At this time, the map generating device may identify a plurality of objects included in the processing region, and generate the selected object model at the location of each of the plurality of identified objects. Here, the map generating device may calculate the area of each of the plurality of identified objects, change the area of the object model to be placed in the location of each object to correspond to the area of a corresponding object, and then place the object model. Further, the map generating device may set the height of the object model as the height of the processing region.

Figure 14:
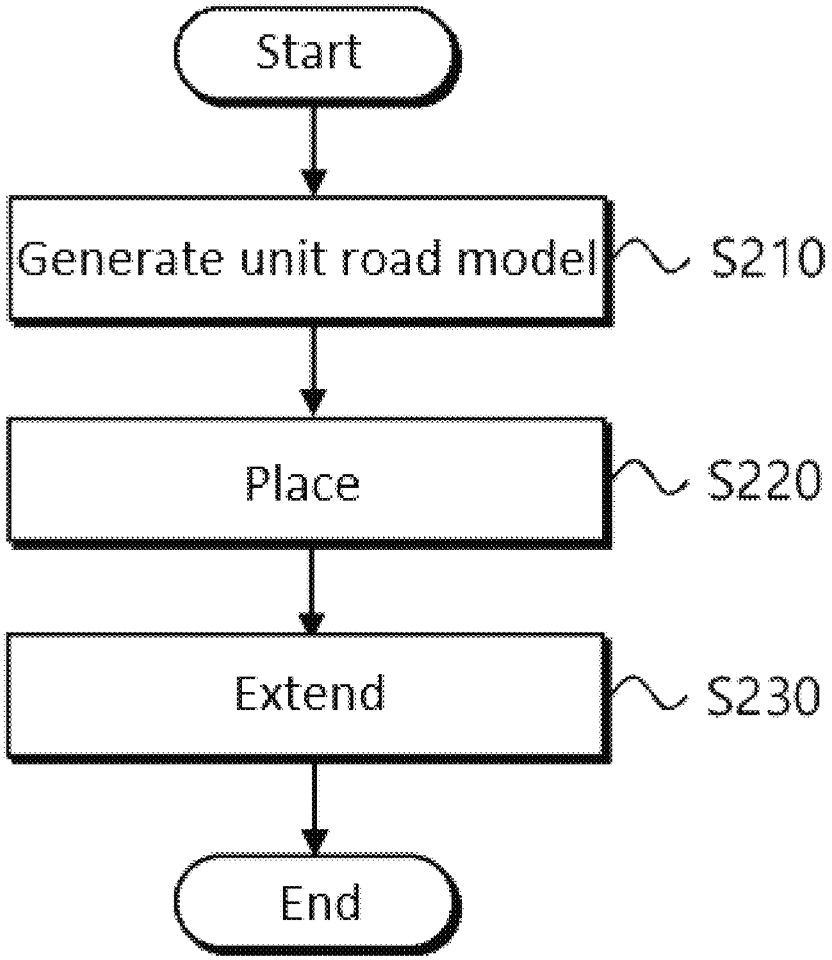
FIG. 14 is a flowchart illustrating a road generating method according to an embodiment of the present disclosure.

FIG. 14 is a flowchart illustrating a road generating method according to an embodiment of the present disclosure.

Referring to FIG. 14, in step S210, the map generating device may generate the unit road model to generate at least one 3D road model on the map that is created based on the aerial view video. Here, the unit road model may be the road model of a preset size including all the minimum components of the road that is to be generated.

According to an embodiment, the map generating device may select at least one among the plurality of pre-stored component models for the minimum components constituting the road, and combine at least one selected component model, thereby generating the unit road model.

According to another embodiment, the map generating device may select at least one point on the map, identify the road based on the selected point, and estimate the shape of the road based on the RGB (Red, Green, Blue) value of the identified road. The map generating device may generate, on the map, the pre-stored unit road model whose similarity to the shape of the estimated road is higher than a preset value.

Next, in step S220, the map generating device may place the generated unit road model on the map. At this time, the map generating device may select at least one point on the map, identify the road based on the selected point, and estimate the shape of the road based on the RGB value of the identified road. Here, the map generating device may identify the direction of the road based on the shape of the estimated road, and place the unit road model based on the identified road direction.

Further, in step S230, the map generating device may extend the placed unit road model, thereby generating the road model.

Specifically, the map generating device may select the extension range based on the unit road model placed on the map, and extend the unit road model within the selected extension range.

According to an embodiment, the map generating device may extend the unit road model within the selected extension range, and apply the curvature to the road model created based on the shape of the road existing within the extension range.

According to another embodiment, the map generating device may select at least one point within the identified road, and extend the unit road model to at least one point along the identified road based on the unit road model.

Meanwhile, when encountering the pre-generated road model in the process of extending the unit road model, heights may not match and steps may occur even in the same road due to a difference in ground level or an overpass. Thus, when encountering the pre-generated road model in the process of extending the unit road model, the map generating device may identify a type between the first road model generated by extending the unit road model and the pre-generated second road model, and cause the first road model and the second road model to intersect each other according to the identified type.

According to an embodiment, the map generating device may estimate the height value of a point where roads on the map corresponding to the first road model and the second road model meet, based on the depth information contained in the point cloud data acquired by the lidar along with the aerial view video. The map generating device may perceive the road as the continuous road if a difference between the estimated height values of each road is less than a preset value. Here, the map generating device may connect the first road model and the second road model by applying the average value of the estimated height values of each road.

According to another embodiment, the map generating device may estimate the height value of a point where roads on the map corresponding to the first road model and the second road model meet, based on the depth information contained in the point cloud data acquired by the lidar along with the aerial view video. If a difference between the estimated height values of each road exceeds a preset value, the map generating device may perceive the road as a separate road and apply different heights to the first road model and the second road model to make them intersect.

According to another embodiment, the map generating device may estimate the shape of the road on which the first road model and the second road model intersect based on the RGB value of the map, and identify the road type based on the estimated shape of the road. The map generating device may cause the first road model and the second road model to intersect each other according to the identified road type.

According to a further embodiment, the map generating device may identify a shadow on the road where the first road model and the second road model intersect based on the RGB value of the map, and estimate the relative locations of the first road model and the second road model based on the identified shadow. The map generating device may cause the first road model and the second road model to intersect each other according to the estimated relative locations. At this time, the map generating device may cause the first road model and the second road model to intersect each other by applying a preset height difference according to the width of the identified shadow.

Figure 15:
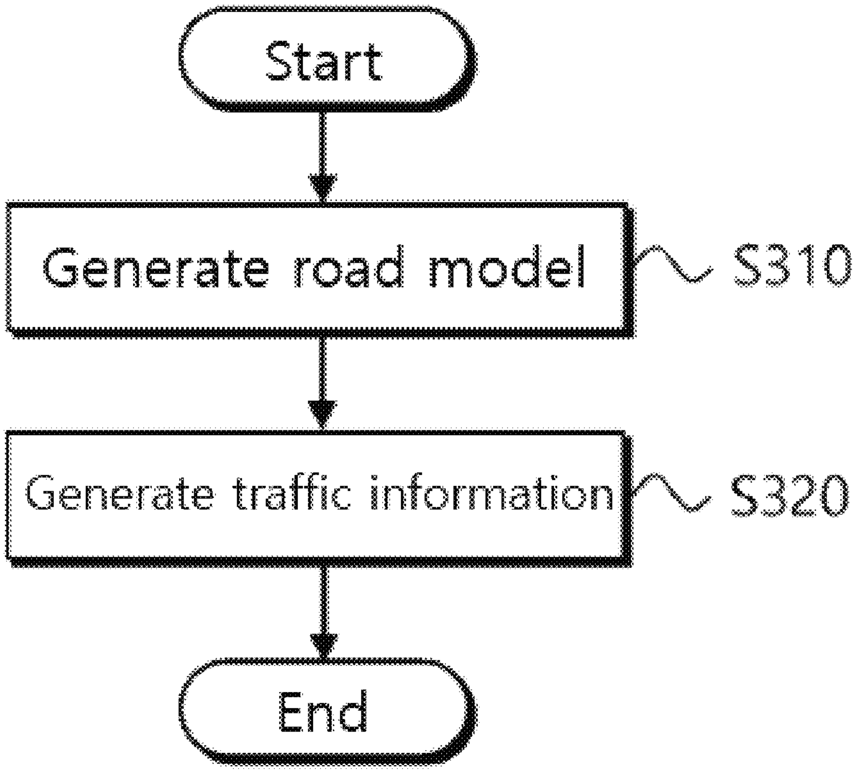
FIG. 15 is a flowchart illustrating a traffic information generating method according to an embodiment of the present disclosure.

FIG. 15 is a flowchart illustrating a traffic information generating method according to an embodiment of the present disclosure.

Referring to FIG. 15, in step S310, the map generating device may generate the road model on the map created using the aerial view video. Meanwhile, the process of generating the road model may be performed through the above-described road model generating method.

Next, in step S320, the map generating device may generate the traffic information on the generated road model. Specifically, the map generating device may generate at least one vehicle model moving at a preset speed along each lane of the road model.

According to an embodiment, the map generating device may receive real-time vehicle congestion information on the road corresponding to the road model, and may determine at least one of the number and speed of vehicle models for each region of the road model according to the vehicle congestion information received in real time.

According to another embodiment, the map generating device may receive weather information of a region corresponding to the location of the road model in real time, and determine at least one of the number and speed of vehicle models for each region of the 3D road model according to the weather information received in real time. At this time, the map generating device may pre-store the number and speed of vehicle models for each weather.

According to another embodiment, the map generating device may receive the video of the road corresponding to the location of the road model, analyze a traffic volume based on the received video, and create a vehicle model on the road model in response to the analyzed traffic volume. At this time, the map generating device may receive the video of the road from the closed circuit television (CCTV) installed in each road.

The map generating device may generate the vehicle model by varying at least one of the number and speed of vehicle models for each lane of the road model based on the measured traffic volume for each lane. Here, the map generating device may estimate the speed of objects detected in the received video, and determine the speed of the generated vehicle model for each lane by applying the average speed value of the estimated objects. Moreover, the map generating device may estimate the type of the detected vehicle based on the size of the detected object, and create the pre-stored vehicle model depending on the estimated vehicle type in the road model in response to the traffic volume.

According to another embodiment, the map generating device may receive speed limit information on the road corresponding to the road model, and determine the speed of the vehicle model for each region of the road model according to the received speed limit information on the road.

According to another embodiment, the map generating device may receive traffic facility information on the road corresponding to the road model, and generate the traffic facility model at a corresponding location of the road model based on the received traffic facility information. At this time, the map generating device may receive in real time the traffic signal corresponding to the generated traffic facility model and control the movement of the generated vehicle model in real time according to the traffic signal received in real time.

As described above, preferred embodiments of the present disclosure have been disclosed in the specification and drawings. However, it is self-evident to those skilled in the art that other modifications may be made in addition to the embodiments disclosed herein. Although specific terms are used in the specification and drawings, they are merely for the purpose of describing particular embodiments only and are not intended to be limiting. Accordingly, the above description should not be construed as restrictive in all respects and should be considered illustrative. The scope of the present disclosure is indicated by the scope of the claims described below rather than a detailed description, and all changes or modifications derived from claims and equivalences thereof should be construed as being included in the scope of the present disclosure.

DESCRIPTION OF REFERENCE NUMERALS

100: data collecting device
200: map generating device
205: communication part
210: input/output part
215: map generating part
220: object generating part
225: road generating part
230: traffic information generating part

What is claimed is:

1. A method of a map generating device for creating a three-dimensional (3D) object for an aerial view video-based map comprising:

generating a 3D map by receiving an aerial view video and measurement data on a photographing reference point;

generating a deviation-corrected orthoimage based on the aerial view video and the measurement data and placing the deviation-corrected orthoimage in a 3D space;

designating a processing region for generating at least one 3D object model on the 3D map, wherein the designating the processing region comprises:

identifying a plurality of objects included in the designated processing region based on depth information contained in point cloud data acquired by a lidar as well as the aerial view video;

estimating an average height of the identified plurality of objects; and designating a height of the designated processing region based on the estimated average height;

selecting a type of an object model that is to be generated in the designated processing region, wherein the selecting the type of the object model includes:

extracting an edge existing in the designated processing region;

extracting one or more enclosures by the extracted edge;

identifying a plurality of objects existing in the designated processing region through the extracted one or more enclosures;

classifying a type of the identified plurality of objects based on a shape of the identified plurality of objects by inputting an image of the designated processing region into an artificial intelligence (AI) model that has undergone prior machine learning and by estimating a type of each identified object through assigning a class label to the each identified object; and selecting a type of an object that exists most frequently in the designated processing region as the selected type of the object model; and generating a pre-stored object model corresponding to the selected type within the designated processing region at a location of each of the identified plurality of objects, wherein the generating the pre-stored object model comprises:

calculating an area of each of the identified plurality of objects;

dynamically changing an area of the pre-stored object model to correspond to the calculated area of the identified plurality of objects; and setting a height of the pre-stored object model to match the designated height of the designated processing region.

2. The method of claim 1, wherein the designating selects a plurality of points on the 3D map, and designates a polygon, made by connecting the plurality of points based on a selected order, as the designated processing region.

3. The method of claim 1, wherein the designating selects at least one object on the 3D map, identifies a set of similar objects whose similarity to the at least one object is higher than a preset value based on the at least one object, and designates a region including all the set of similar objects as the designated processing region.

4. The method of claim 3, wherein the set of similar objects is identified by:

generating an RGB (Red, Green, Blue) histogram representing a brightness distribution of each primary color for pixels of the at least one object; and comparing the generated RGB histogram with RGB histograms generated for other objects on the 3D map to calculate the similarity.

5. The method of claim 1, wherein the designating identifies a plurality of objects included in the designated processing region based on depth information contained in point cloud data acquired by a lidar as well as the aerial view video, estimates an average height of the plurality of objects, and designates a height of the processing region based on the average height, and wherein the identifying the plurality of objects comprises estimating a set of points whose depth difference is less than a preset value as a single object.

6. The method of claim 1, wherein the designating identifies an actual location on the 3D map of the designated processing region, extracts altitude restriction information about a building on a land corresponding to the actual location, and designates a height of the designated processing region based on the altitude restriction information, and wherein extracting the altitude restriction information comprises accessing a database that stores altitude restriction information corresponding to various locations and searching the database using the identified actual location.

7. The method of claim 1, wherein the selecting the type of the object model displays a pre-stored object model list corresponding to the type of the object model and selects one of the pre-stored object model list.

8. A non-transitory computer-readable recording medium storing a computer program, wherein the computer program, when executed by a computing device comprising a memory, a transceiver, and a processor, executes a method comprising:

generating a 3D map by receiving an aerial view video and measurement data on a photographing reference point;

generating a deviation-corrected orthoimage based on the aerial view video and the measurement data and placing the deviation-corrected orthoimage in a 3D space;

designating a processing region for generating at least one 3D object model on the 3D map, wherein the designating the processing region comprises:

identifying a plurality of objects included in the designated processing region based on depth information contained in point cloud data acquired by a lidar as well as the aerial view video;

estimating an average height of the identified plurality of objects; and designating a height of the designated processing region based on the estimated average height;

selecting a type of an object model that is to be generated in the designated processing region, wherein the selecting the type of the object model includes:

extracting an edge existing in the designated processing region;

extracting one or more enclosures by the extracted edge;

identifying a plurality of objects existing in the designated processing region through the extracted one or more enclosures;

classifying a type of the identified plurality of objects based on a shape of the identified plurality of objects by inputting an image of the designated processing region into an artificial intelligence (AI) model that has undergone prior machine learning and by estimating a type of each identified object through assigning a class label to the each identified object; and selecting a type of an object that exists most frequently in the processing region as the selected type of the object model; and generating a pre-stored object model corresponding to the selected type within the designated processing region at a location of each of the identified plurality of objects, wherein the generating the pre-stored object model comprises:

calculating an area of each of the identified plurality of objects;

dynamically changing an area of the pre-stored object model to correspond to the calculated area of the of the identified plurality of objects; and setting a height of the pre-stored object model to match the designated height of the designated processing region.

* * * * *